United States Patent
Yang (10) Patent No.: US 8,736,755 B2
(45) Date of Patent: May 27, 2014

(54) DISPLAY APPARATUS AND CONTROL METHOD THEREOF

(75) Inventor: Deok-jin Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1365 days.

(21) Appl. No.: 11/950,170

(22) Filed: Dec. 4, 2007

(65) Prior Publication Data

US 2009/0015715 A1    Jan. 15, 2009

(30) Foreign Application Priority Data

Jul. 10, 2007   (KR) .................. 10-2007-0069012

(51) Int. Cl.
*H04N 7/01* (2006.01)
*H04N 3/27* (2006.01)
*H04N 5/46* (2006.01)

(52) U.S. Cl.
USPC .......... 348/441; 348/554; 348/555; 348/556; 348/557; 348/558

(58) Field of Classification Search
USPC .................................. 348/554–558
See application file for complete search history.

(56) References Cited

U.S. PATENT DOCUMENTS 6,081,264 A * 6/2000 Rosen et al. ................. 715/723
7,639,268 B2 * 12/2009 Tsunoda ....................... 345/635
2005/0078942 A1 4/2005 Kato et al.
2005/0128366 A1 * 6/2005 Cha ............................... 348/837
2006/0012707 A1 * 1/2006 Chow ............................ 348/441
2006/0077290 A1 4/2006 Chung et al.
2007/0195737 A1 * 8/2007 Walker et al. ................. 370/335
2007/0279512 A1 * 12/2007 Maruyama et al. ...... 348/333.11
2008/0151108 A1 * 6/2008 Doswald ....................... 348/456

FOREIGN PATENT DOCUMENTS

KR    1020050056162 A    6/2005
KR    100555576 B1    2/2006

OTHER PUBLICATIONS

Communication issued on Dec. 20, 2011 by the Korean Intellectual Property Office in counterpart Korean Patent Application No. 10-2007-0069012.

* cited by examiner

*Primary Examiner* — Gigi L Dubasky
(74) *Attorney, Agent, or Firm* — Sughrue Mion, PLLC (57) ABSTRACT

A display apparatus, includes: a display unit; a signal receiving unit which receives a video signal; a signal processing unit which processes the video signal received by the signal receiving unit to be displayed; an input unit through which a frame rate demonstration function is selectable; and a control unit which controls the signal processing unit so that the video signal is processed into an inherent frame rate of the video signal and at least one corrected frame rate which is different from the inherent frame rate to be displayed in different areas of the display unit if the frame rate demonstration function is selected through the input unit.

21 Claims, 8 Drawing Sheets

DISPLAY APPARATUS AND CONTROL METHOD THEREOF

CROSS-REFERENCE TO RELATED APPLICATIONS

This application claims priority from Korean Patent Application No. 10-2007-0069012, filed on Jul. 10, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to display of a film video signal on display apparatus.

2. Description of the Related Art

Recently, as a screen size of a display apparatus, such as a plasma display panel (PDP) and a liquid crystal display (LCD), has increases, many users watch movies through the display apparatus at home rather than going to a movie theater.

In general, a movie showed at the movie theater, i.e., a film video signal, is generated to have 24 or 25 frames per second, and the generated frames are respectively stored in a film to be displayed on a screen by a progressive scan method. The progressive scan method is to display a single screen on the screen at once by a frame unit.

However, most display apparatuses currently employ an interlace scan method in which the single screen is divided into more than two fields to be displayed on the screen in sequence. According to a transmission type, these display apparatuses process video by 60 fields per second in case of a National Television System Committee (NTSC) standard, and process the video by 50 fields per second in case of a Sequential Couleur a Memoire (SECAM) standard to be displayed on the screen.

Accordingly, due to the above difference, if the film video signal is played by the display apparatuses, a user is not able to watch a normal film video because the number of the frames displayed per second is different. To solve this problem, video processing for changing a frame rate of the film video, and increasing the number of the frames is necessary.

SUMMARY OF THE INVENTION

The present invention provides a display apparatus and a control method thereof enabling a user to recognize a display environment having a frame rate which varies.

The present invention also provides a display apparatus and a control method thereof displaying a user interface information for enabling a user to directly execute, determine and change a demonstration function of the display apparatus.

According to an aspect of the present invention, there is provided a display apparatus, including: a display unit; a signal receiving unit which receives a video signal; a signal processing unit which processes the video signal to be displayed; a user input unit which selects a frame rate demonstration function; and a control unit which controls the signal processing unit so that the video signal can be processed into an inherent frame rate of the video signal and at least one corrected frame rate which is different from the inherent frame rate to be displayed in different areas of the display unit if the frame rate demonstration function is selected.

The video signal may include a film video signal.

The inherent frame rate may be 24 frames per second or 25 frames per second.

The corrected frame rate may be 30 frames per second or 25 frames per second.

The signal processing unit may perform a 3:2 pull down or a 2:2 pull down with respect to the video signal, and then perform a deinterlacing with respect to the video signal which passes through the pull down.

The video signal which is processed into the inherent frame rate may be displayed in a first area of the display unit, and the video signal which is processed into the corrected frame rate may be displayed in the remaining area of the display unit.

The video signal which is processed into the inherent frame rate may be displayed in a picture-in-picture (PIP) configuration in the display unit.

The display apparatus may further include a user interface generating unit which generates a user interface information, wherein the control unit controls the user interface generating unit so that a menu window which sets and changes a demonstration time for which the frame rate demonstration function is performed, and adjusts a type or a size of an area to display the video signal, which is processed into the inherent frame rate and the corrected frame rate, in the display unit if the frame rate demonstration function is selected.

The control unit may control the signal processing unit so that the video signal which is processed into the corrected frame rate can be displayed in an entire area of the display unit if a predetermined demonstration time elapses after the frame rate demonstration function is performed.

The display apparatus may further include a user interface generating unit which generates a user interface information, wherein the control unit controls the user interface generating unit so that an end informing window which ends the frame rate demonstration function can be displayed in the display unit if a predetermined demonstration time elapses after the frame rate demonstration function is performed.

The display apparatus may further include a storing unit, wherein the control unit stores the received video signal in the storing unit.

According to another aspect of the present invention, there is provided a display apparatus including: a display unit; a scaler which processes a video signal; and a control unit which controls the scaler to perform a frame rate demonstration function which respectively processes a film video signal into an inherent frame rate of the film video signal, and a corrected frame rate which is different from the inherent frame rate to be displayed in the display unit if the film video signal is input.

The display apparatus may further include a user input unit which controls the frame rate demonstration function.

The scaler may perform a 3:2 pull down or a 2:2 pull down with respect to the film video signal, and then perform a deinterlacing with respect to the film video signal which passes through the pull down.

The film video signal which is processed into the inherent frame rate may be displayed in a picture-on-picture (POP) configuration in the display unit.

The film video signal which is processed into the inherent frame rate may be displayed in a picture-in-picture (PIP) configuration in the display unit.

According to another aspect of the present invention, there is provided a control method of a display apparatus which includes a display unit, the control method of the display apparatus including: receiving a video signal; processing the video signal into an inherent frame rate of the video signal, and a corrected frame rate which is different from the inherent frame rate; and displaying the video signal which is processed into the inherent frame rate in a first area of the display unit, and displaying the video signal which is processed into the corrected frame rate in a second area of the display unit.

The video signal may include a film video signal.

The displaying may include displaying the video signal which is processed into the inherent frame rate in a picture-on-picture (POP) configuration in the display unit.

The displaying may include displaying the video signal which is processed into the inherent frame rate in a picture-in-picture (PIP) configuration in the display unit.

The control method may further include receiving a control signal which performs the frame rate demonstration function before the processing.

The processing may include performing a 3:2 pull down or a 2:2 pull down with respect to the video signal, and then performing a deinterlacing with respect to the video signal which passes through the pull down.

The displaying may further include displaying the video signal which is processed into the corrected frame rate in an entire area of the display unit if a predetermined demonstration time elapses.

BRIEF DESCRIPTION OF THE DRAWINGS

These and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Reference will now be made in detail to the embodiments of the present invention, examples of which are illustrated in the accompanying drawings, wherein like reference numerals refer to like elements throughout. The exemplary embodiments are described below so as to explain the present invention by referring to the figures.

Figure 1:
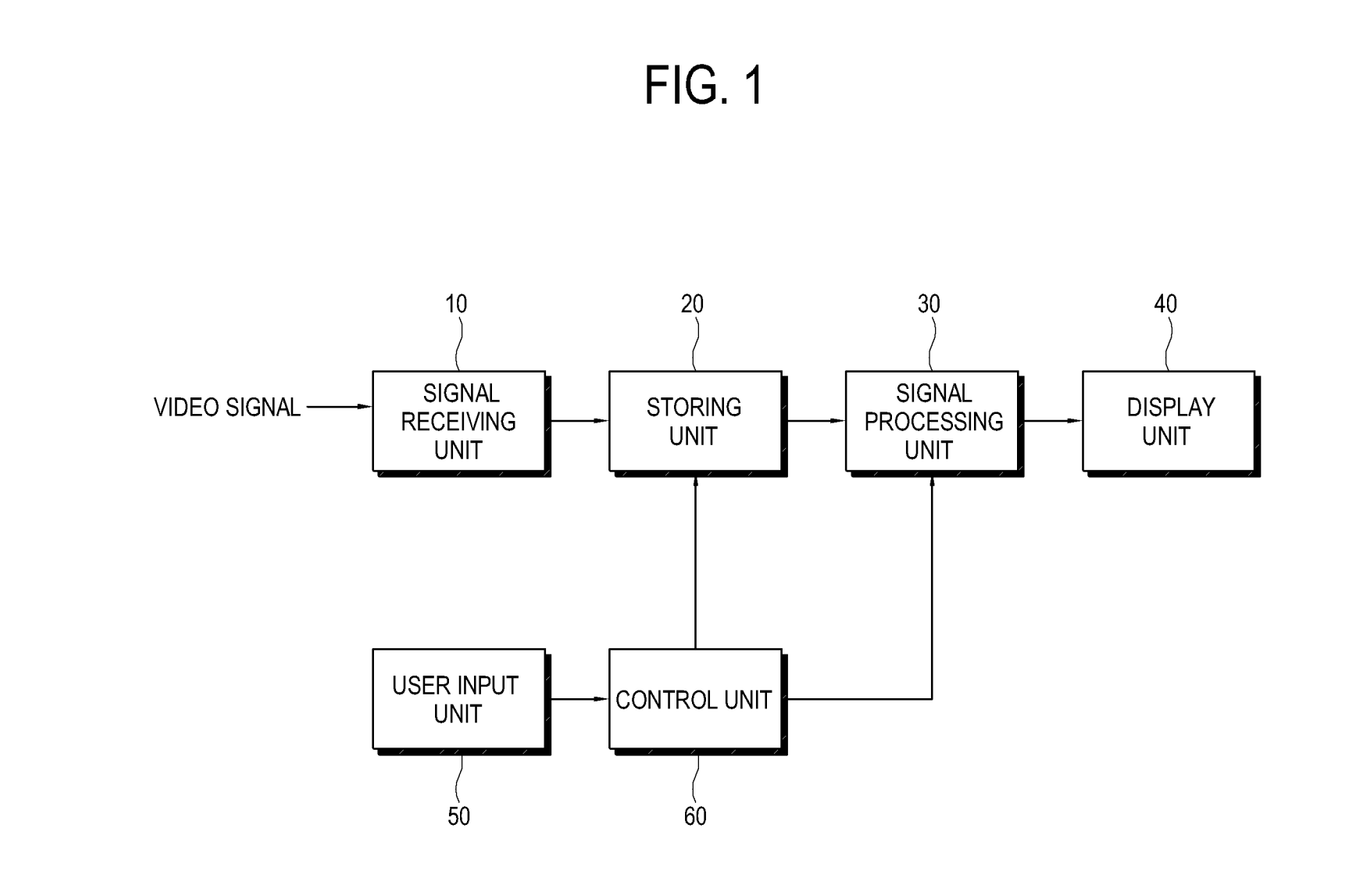
FIG. 1 is a control block diagram of a display apparatus according to a first exemplary embodiment of the present invention.

FIG. 1 is a control block diagram of a display apparatus according to a first exemplary embodiment of the present invention. As shown therein, the display apparatus includes a signal receiving unit 10, a storing unit 20, a signal processing unit 30, a display unit 40, a user input unit 50 and a control unit 60 controlling these. The display apparatus according to the present exemplary embodiment may include a plasma display panel (PDP), a liquid crystal display (LCD) panel or other known display panel employing progressive scanning, and displays video corresponding to 60 fields per second according to the NTSC standard.

The signal receiving unit 10 receives a video signal from an external source. The video signal received by the signal receiving unit 10 may include a broadcasting signal or a video signal received from an audio video device such as a digital versatile disk (DVD), and may include a video signal stored in the display apparatus. The signal receiving unit 10 may further include a tuner that tunes the broadcasting signal, or a module that receives and decodes a digital broadcasting signal. Also, the signal receiving unit 10 may include a connection port and a video interface connected with the audio video device.

The storing unit 20 stores the video signal received under a control of the control unit 60. Since a signal processing is necessary if the received video signal has a frame rate that is different from a frame rate supportable by the display apparatus, the video signal is stored in the storing unit 20 in advance.

The signal processing unit 30 processes the received video signal, and outputs the processed video to be displayed by the display unit 40. The signal processing unit 30 may be provided as a scaler that scales the video signal to correspond to a format of the display unit 40. The scaler counts the number of frames of the input video signal per second to determine an inherent frame rate.

If the input video signal has 60 fields per second, that is, the frame rate of 30 frames per second, the signal processing unit 30 appropriately processes the video signal so that the video signal of 60 fields per second can be displayed in the display unit 40.

On the other hand, if the inherent frame rate of the input video signal is not 30 frames per second, the signal processing unit 30 processes the video signal so that the frame rate of the video signal can be changed to be a corrected frame rate, that is, 30 frames per second. If the frame rate of the input video signal is over 30 frames per second, duplicate or similar video signals may be extracted to reduce the frame rate. If the frame rate of the input video signal is under 30 frames per second, the video signal by frame is synthesized or newly generated to increase the frame rate.

Figure 2:
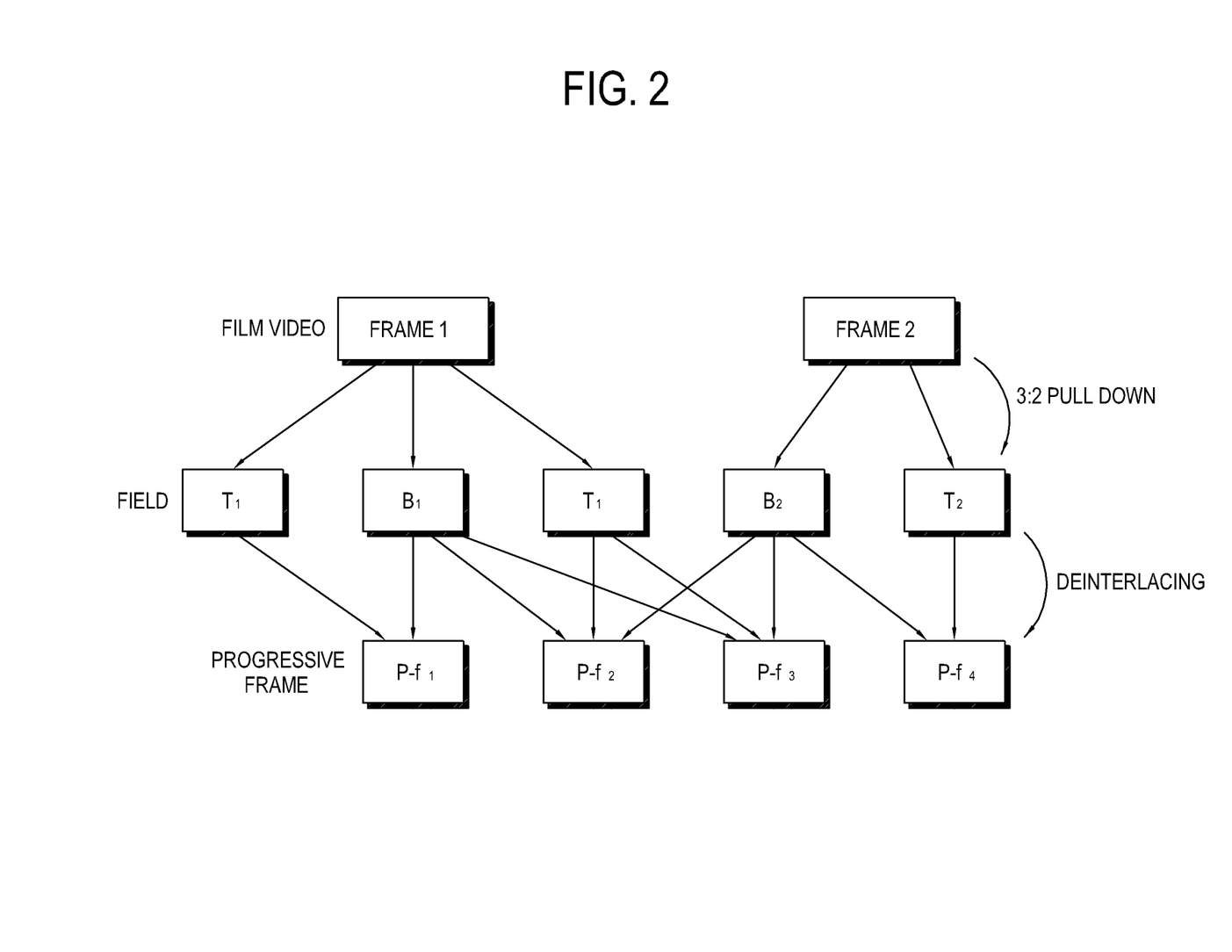
FIG. 2 illustrates a signal processing of a signal processing unit according to the first exemplary embodiment of the present invention.

FIG. 2 illustrates a signal processing of the signal processing unit 30 according to the first exemplary embodiment of the present invention. In the present exemplary embodiment, the video signal is a film video signal having the inherent frame rate of 24 frames per second. To appropriately replay the film video signal, the signal processing unit 30 processes the video signal into the corrected frame rate instead of the inherent frame rate. If the signal processing unit 30 processes the video signal in the inherent frame rate, the video signal displayed in the display unit 40 is incapable of being smoothly connected between screens. Especially, since a motion video is interrupted, a user is incapable of normally watching the film video signal.

At first, the signal processing unit 30 performs a 3:2 pull down with respect to the film video signal, and increases the number of fields of the video signal. To obtain the 60 fields from 24 frames per second, five fields are obtained from two frames (frame 1 and frame 2). A video signal processing process obtaining three fields such as a top field (T1), a bottom field (B1) and a top field (T1) from the frame 1, and obtaining a top field (T2), a bottom field (B2) from the frame 2 refers to the 3:2 pull down or a telecine process. One of the top field and the bottom field is repeated to obtain three fields from a single frame of the film video signal.

The signal processing unit 30 performs a deinterlacing with respect to the video signal so that the video signal obtained through the 3:2 pull down can be displayed in the progressive scan mode. The deinterlacing changes the video signal of an interlacing format to have the progressive format, and is known as an inverse telecine. The deinterlacing of the video signal has various methods and may combine a plurality of fields to form a new frame. The signal processing unit 30 performs a motion compensation presuming motion from video of more than two sequential fields by making a middle video to prevent a motion judder typically occurring in the video signal formed through the deinterlacing. That is, as shown therein, a first progressive frame P-f1 is formed based on the top field T1 and the bottom field B1 of the frame 1, and a second progressive frame P-f2 is formed based on the bottom field B1 and the top field T1 of the frame 1, and the bottom field B2 of the frame 2. The first progressive frame P-f1 reproduces the video signal of the frame 1 as it is, but the second progressive frame P-f2 is the video signal newly formed with a consideration of motion between the video signals. In this manner, 60 progressive frames are formed per second by performing the deinterlacing with respect to the film video signal, and consequently, the video signal is processed into the corrected frame rate to be displayed. If the corrected frame as described above is formed with a consideration of the motion of the video signal, the user can watch a motion picture having an improved quality. The video signal processing of the signal processing unit 30 for preventing the motion judder may be performed by a FRC 9wxyM standard of MICRONAS, or other known compensation frame forming methods.

If there are a plurality of frame rates which the display apparatus is capable of supporting, the signal processing unit 30 may change the inherent frame rate into a plurality of corrected frame rates.

The display unit 40 displays the video signal output from the video processing unit 30. The display unit 40 may be provided as a PDP, an LCD panel, or other known display panel.

The user may select a frame rate demonstration function through the user input unit 50. The frame rate demonstration function is provided to simultaneously display the video signal processed into the corrected frame rate by the signal processing unit 30, and the video signal processed into the inherent frame rate in being received if it is necessary to change the frame rate of the video signal. By employing this demonstration function, the user can more easily understand a display environment of the display apparatus, and visually recognize that the film video signal is currently processed by the display apparatus. Since the user can easily understand a signal processing superiority of the signal processing unit 30, a manufacturer of the display apparatus can utilize this function for marketing of the display apparatus.

The user input unit 50 may include a abbreviated key and a touch pad provided a housing of the display apparatus, or a typical input device such as a remote control device, a mouse, a keyboard, etc.

The control unit 60 controls the signal processing unit 30 so that the video signal can be respectively processed into the inherent frame rate and the corrected frame rate to be displayed in different areas of the display unit 40 if the frame rate demonstration function is selected. If a control signal for the frame rate demonstration function is input to the signal processing unit 30 which is processing the film video signal, the signal processing unit 30 displays the video signal processed into the corrected frame rate in a first area of the display unit 40, and displays the video signal processed into the inherent frame rate in a second area of the display unit 40. When the signal processing unit 30 processes the film video signal into the inherent frame rate, the video signal bypasses the 3:2 pull down process. Alternatively, the signal processing unit 30 may include a plurality of circuit configurations for separately processing the video signal having different frame rates.

Figure 3:
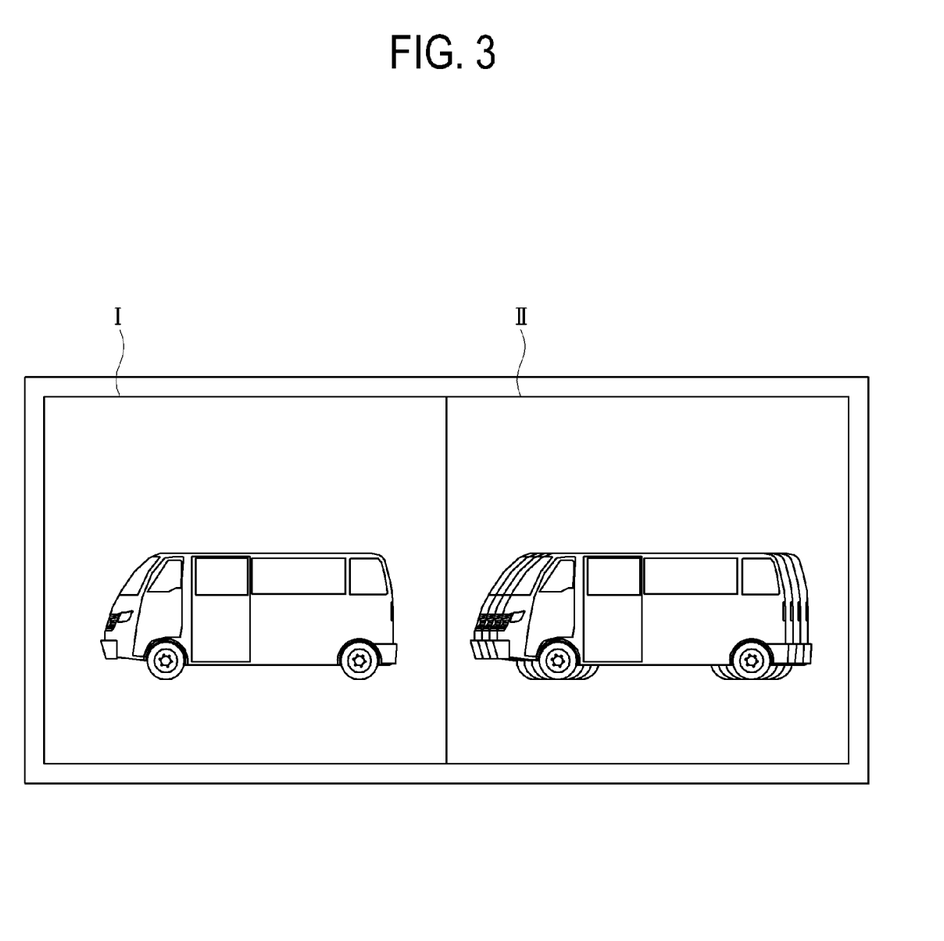
FIG. 3 illustrates a frame rate demonstration image of the display apparatus according to the first exemplary embodiment of the present invention.
Figure 4:
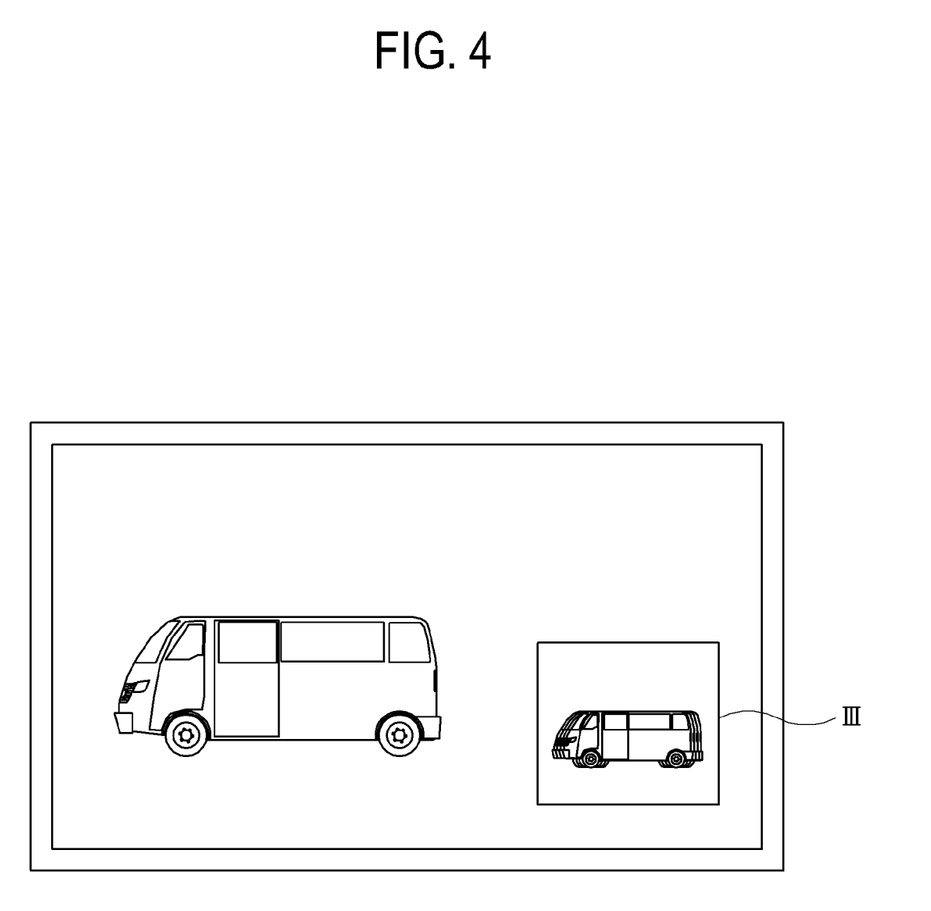
FIG. 4 illustrates another frame rate demonstration image of the display apparatus according to the first exemplary embodiment of the present invention.

FIG. 3 illustrates a frame rate demonstration image of the display apparatus according to the present exemplary embodiment of the present invention, and FIG. 4 illustrates another frame rate demonstration image of the display apparatus according to the first exemplary embodiment of the present invention. As shown in FIG. 3, the video signal processed into the corrected frame rate is displayed in a left area I of the display unit 40, and the video signal processed into the inherent frame rate is displayed in the remaining area II of the display unit 40. That is, two video signals are displayed in the display unit 40 in a picture-on-picture (POP) configuration. The areas I and II may have the same sizes, or different sizes. FIG. 4 illustrates that the video signal processed into the inherent frame rate is displayed in a picture-in-picture (PIP) area III in the display unit 40. In the present exemplary embodiment, since the video signal respectively processed into the inherent frame rate and the corrected frame rate is replayed from the video signal stored in the storing unit 20, it is unnecessary to include an additional signal receiving unit for the POP or PIP screen configurations.

After performing the frame rate demonstration, the control unit 60 displays the video signal processed into the corrected frame rate in an entire area of the display unit 40 to allow the user to watch video without motion judder if a predetermined demonstration time elapses.

Figure 5:
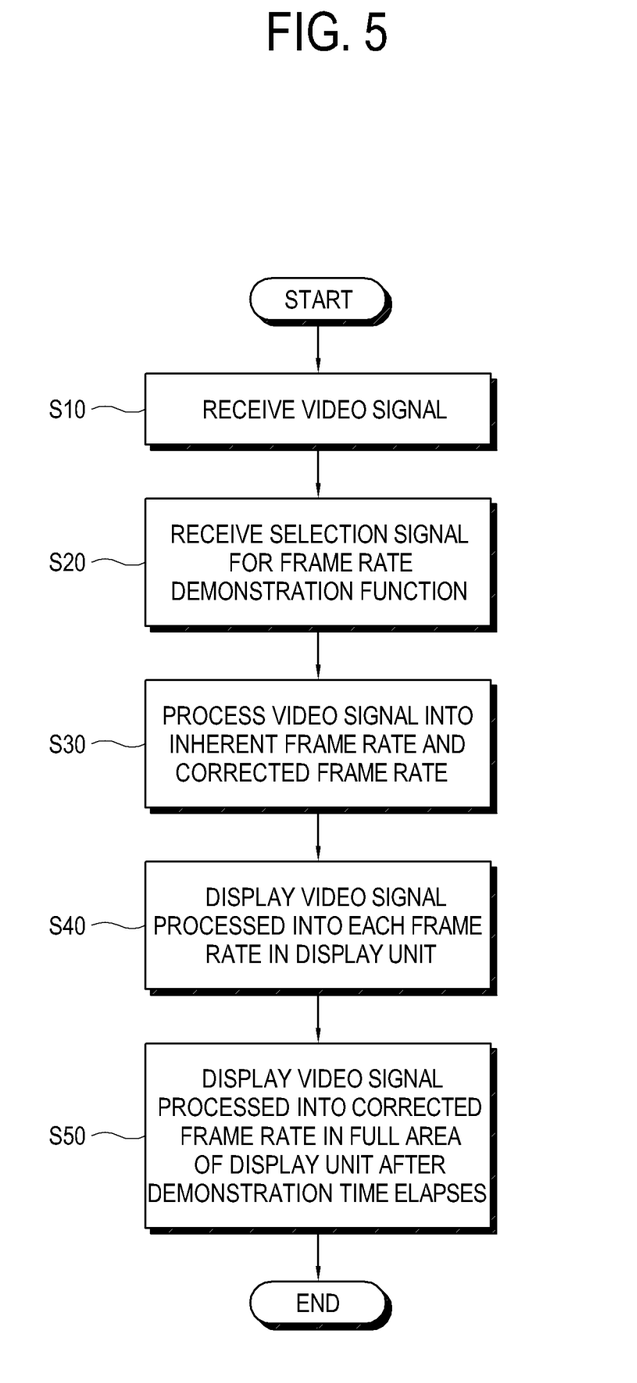
FIG. 5 is a control flowchart illustrating a control method of the display apparatus according to the first exemplary embodiment of the present invention.

FIG. 5 is a control flowchart illustrating a control method of the display apparatus according to the present exemplary embodiment of the present invention.

First, the video signal is received (S10), and a selection signal for performing the frame rate demonstration function is received from the user input unit 50 (S20).

The signal processing unit 30 respectively processes the received video signal into the inherent frame rate and the corrected frame rate (S30). If the inherent frame rate is smaller than the corrected frame rate, the video signal is formed into the 60 fields per second signal through the pull down process, and is converted into the video signal to be displayed in the display unit 40 through the deinterlacing process.

Then, the processed video signal is displayed in different areas of the display unit 40 by each frame rate (S40). The video signal processed into the inherent frame rate may be displayed in the POP configuration or the PIP configuration.

When the frame rate demonstration function may be selected while the video signal is received and displayed, the signal processing unit 30 displays the video signal processed into the inherent frame rate in a certain area of the display unit 40.

After the frame rate demonstration function is performed, if a predetermined demonstration time elapses, the control unit 60 displays the video signal processed into the corrected frame rate in an entire area of the display unit 40 (S50).

Alternatively, the frame rate demonstration function may be automatically performed without being selected through the user input unit 50 if the video signal, such as the film video signal which needs a frame rate change, is input.

Alternatively, the display apparatus may be provided as a cathode ray tube (CRT) employing an interlace scan method, and in this case, the video signal may be processed by only the pull down process.

Figure 6:
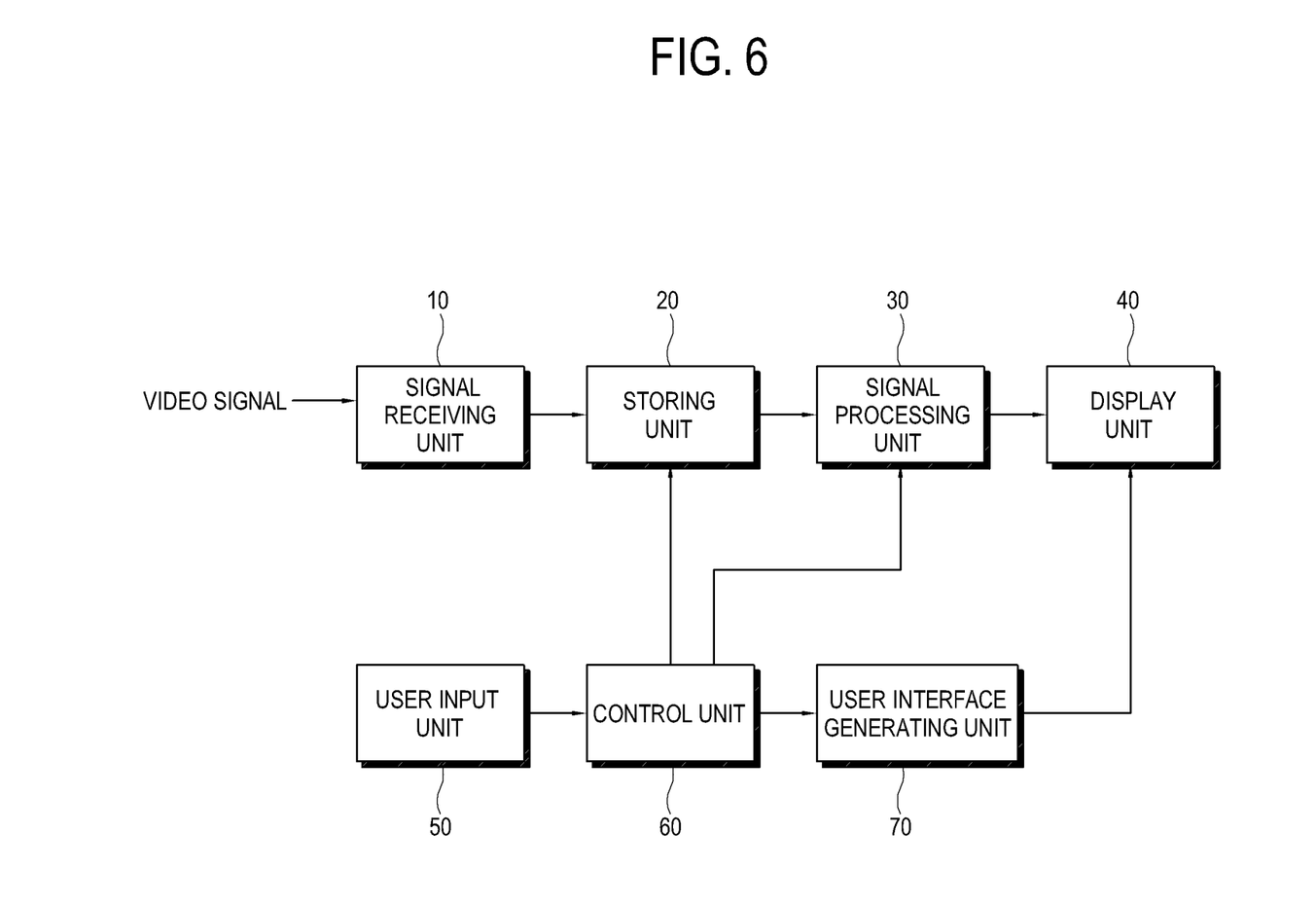
FIG. 6 is a control block diagram of a display apparatus according to a second exemplary embodiment of the present invention.

FIG. 6 is a control block diagram of a display apparatus according to a second exemplary embodiment of the present invention. As shown therein, the display apparatus further includes a user interface generating unit 70 that generates a user interface information under a control of a control unit 60.

If a frame rate demonstration function is selected through a user input unit 50 or a film video signal is input, the control unit 60 generates the user interface information so that a user controls the frame rate demonstration function, and displays this in a display unit 40.

Figure 7:
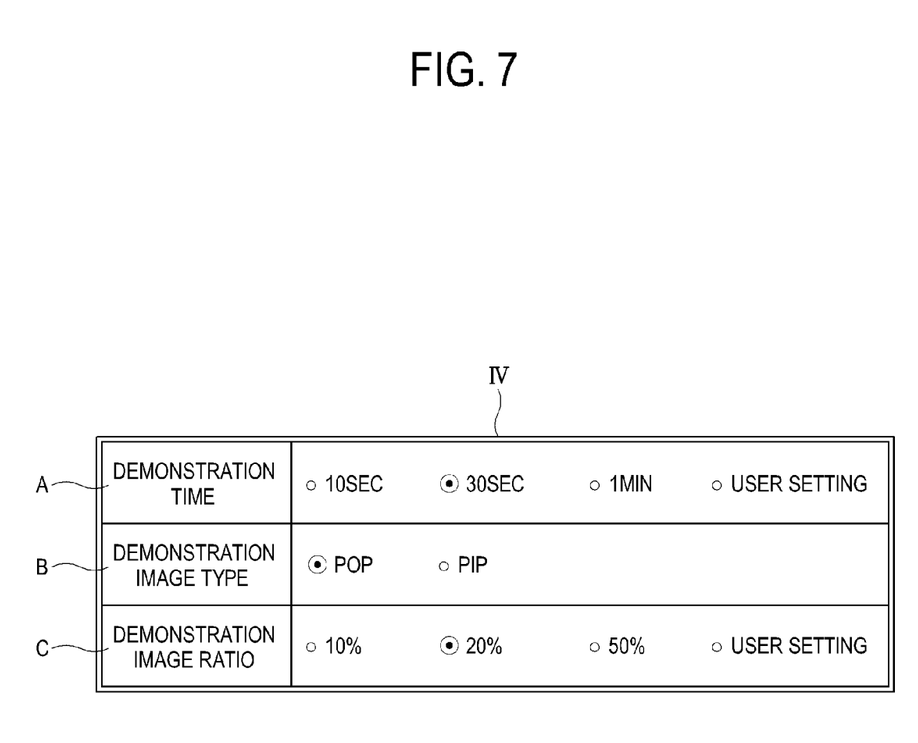
FIG. 7 illustrates a user interface information of the display apparatus according to the second exemplary embodiment of the present invention.

FIG. 7 illustrates a first menu window IV according to the present exemplary embodiment. The first menu window IV includes a demonstration time item A for determining and changing a demonstration time for which the demonstration function is performed, a demonstration image type item B for selecting a demonstration type displaying a video signal processed into an inherent frame rate and a corrected frame rate, and a demonstration image ratio item C for adjusting the size of a displaying area to display the video signal processed into the inherent frame rate. The demonstration time item includes a sub item for selecting 10 seconds, 30 seconds and 1 minute, and a user setting item for setting the demonstration time. Similarly, the remaining items B and C may have a plurality of sub items. A user may determine the demonstration image type as one of the POP configuration and PIP configuration, and determine the size of the displaying area of the demonstration image, that is, the video signal processed into the inherent frame rate.

Figure 8:
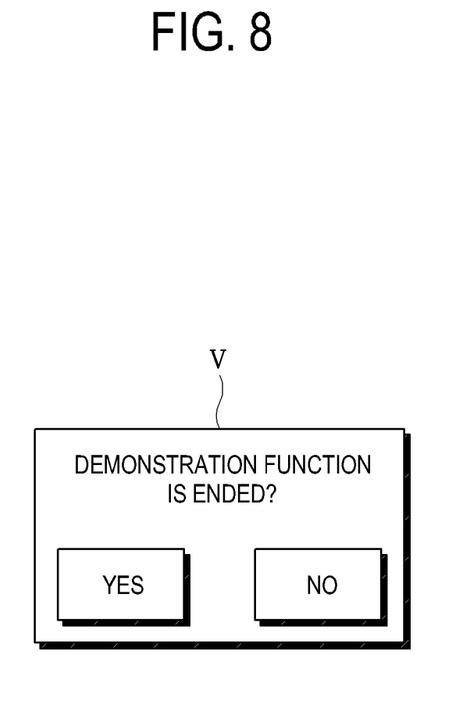
FIG. 8 illustrates another user interface information of the display apparatus according to the second exemplary embodiment of the present invention.

FIG. 8 illustrates a second menu window V according to the present exemplary embodiment. If the demonstration time elapses, the control unit 60 displays the second menu window V for ending the frame rate demonstration function, that is, an end informing window in the display unit 40. A user may set the demonstration time by using the demonstration time item A in FIG. 7, and may also select whether to end the demonstration function if the demonstration time elapses. The second menu window V includes a 'yes' item for selecting the ending, and a 'no' item for maintaining the demonstration function. By using the user input unit 50, the user may control a user interface unit 70 not to generate the second menu window V. Also, in case of maintaining the demonstration function, the demonstration time may be newly determined or remain the existing one.

In addition, various user interface information generated by the user interface generating unit 70 may be displayed to the above menu windows, and the user may control the demonstration function through the user input unit 50.

Alternatively, the display apparatus may process and display video in 50 fields per second depending on a PAL standard or a SECAM standard. Here, a film video signal passes through a 2:2 pull down process.

As described above, the exemplary embodiments of the present invention provides a display apparatus and a control method thereof enabling a user to easily recognize a display environment having a frame rate which varies.

Also, the exemplary embodiments of the present invention provides a display apparatus and a control method thereof displaying a user interface information for enabling a user to directly execute, determine and change a demonstration function of the display apparatus.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display unit;
   a signal receiving unit which receives a video signal which comprises a film video signal;
   a signal processing unit which processes the video signal received by the signal receiving unit to be displayed on the display unit;
   an input unit through which a frame rate demonstration function is selectable; and
   a control unit which controls the signal processing unit so that the video signal is processed into an inherent frame rate of the video signal and at least one corrected frame rate which is different from the inherent frame rate to be displayed in different areas of the display unit in response to the frame rate demonstration function being is selected through the input unit, and controls the signal processing unit so that the video signal is processed into the corrected frame rate in response to the frame rate demonstration function is not being implemented,
   wherein when the frame rate demonstration function is selected by a user, the video signal processed into the inherent frame rate and the video signal processed into the corrected frame rate are simultaneously displayed in the different areas of the display unit based on the user selection of a type of display area, when the frame rate demonstration function is not selected by the user, the video signal processed into the corrected frame rate is displayed in an entire area of the display unit, and
   wherein when the frame rate demonstration function is selected by the user, the control unit controls to display a menu window which is used to select the type of the display area to simultaneously display the video signal in the inherent frame rate and the video signal in the corrected frame rate on the display unit.

2. The display apparatus according to claim 1, wherein the inherent frame rate is 24 frames per second or 25 frames per second.

3. The display apparatus according to claim 2, wherein the corrected frame rate is 30 frames per second or 25 frames per second.

4. The display apparatus according to claim 3, wherein the signal processing unit performs one of a 3:2 pull down and a 2:2 pull down with respect to the video signal, and then performs deinterlacing with respect to the video signal which subjected to the one of the 3:2 pull down and the 2:2 pull down.

5. The display apparatus according to claim 1, wherein the video signal which is processed into the inherent frame rate is displayed in a first area of the display unit, and the video signal which is processed into the corrected frame rate is displayed in a second area of the display unit which is different from the first area.

6. The display apparatus according to claim 1, wherein if a picture-in-picture type is selected from the menu window, the video signal which is processed into the inherent frame rate is displayed in a picture-in-picture configuration on the display unit.

7. The display apparatus according to claim 1, further comprising a user interface generating unit which generates a user interface information,
   wherein the control unit controls the user interface generating unit so that the menu window which sets and changes a demonstration time for which the frame rate demonstration function is performed, and adjusts a size of an area to display the video signal, which is processed into the inherent frame rate and the corrected frame rate, on the display unit if the frame rate demonstration function is selected through the input unit.

8. The display apparatus according to claim 1, wherein the control unit controls the signal processing unit so that the video signal which is processed into the corrected frame rate is displayed in the entire area of the display unit if a demonstration time elapses after the frame rate demonstration function is performed.

9. The display apparatus according to claim 8, further comprising a user interface generating unit which generates a user interface information,
wherein the control unit controls the user interface generating unit so that an end informing window which ends the frame rate demonstration function is displayed on the display unit if the demonstration time elapses after the frame rate demonstration function is performed.

10. The display apparatus according to claim 1, further comprising a storing unit in which the received video signal is stored under control of the control unit.

11. A display apparatus comprising:
a display unit;
a scaler which processes a film video signal; and
a control unit which controls the scaler to perform a frame rate demonstration function which processes the film video signal into an inherent frame rate of the film video signal and a corrected frame rate which is different from the inherent frame rate to be displayed on the display unit and controls the scaler so that the film video signal is processed into the corrected frame rate in response to the frame rate demonstration function is not being implemented,
wherein when the frame rate demonstration function is selected by a user, the film video signal processed into the inherent frame rate and the film video signal processed into the corrected frame rate are simultaneously displayed in different areas of the display unit based on the user selection of a type of display area, when the frame rate demonstration function is not selected by the user, the video signal processed into the corrected frame rate is displayed in an entire area of the display unit, and
wherein the control unit controls to display a menu window which is used to select the type of the display area to simultaneously display the film video signal in the inherent frame rate and the film video signal in the corrected frame rate on the display unit in response to the frame rate demonstration function is selected through an input unit by the user.

12. The display apparatus according to claim 11, further comprising a user input unit which controls the frame rate demonstration function.

13. The display apparatus according to claim 11, wherein the scaler performs one of a 3:2 pull down and a 2:2 pull down with respect to the film video signal, and then performs a deinterlacing with respect to the film video signal which is subjected to the one of the 3:2 pull down and the 2:2 pull down.

14. The display apparatus according to claim 11, wherein if a picture-on-picture type is selected from the menu window used to select the type of the area to display the film video signal, the film video signal which is processed into the inherent frame rate is displayed in a picture-on-picture configuration on the display unit.

15. The display apparatus according to claim 11, wherein if a picture-in-picture type is selected from the menu used to select the type of the area to display the film video signal, the film video signal which is processed into the inherent frame rate is displayed in a picture-in-picture configuration on the display unit.

16. A control method of a display apparatus which comprises a display unit, the control method comprising:
receiving a video signal which comprises a film video signal;
selecting a type of a display area from a menu window to display the video signal in response to a frame rate demonstration function being implemented;
processing the video signal into an inherent frame rate of the video signal, and a corrected frame rate which is different from the inherent frame rate in response to the frame rate demonstration function being implemented; and
displaying the video signal which is processed into the inherent frame rate in a first area of the display unit, and displaying the video signal which is processed into the corrected frame rate in a second area of the display unit,
wherein the video signal is processed into the corrected frame rate in response to the frame rate demonstration function not being implemented, and
wherein when the frame rate demonstration function is selected by a user, the video signal processed into the inherent frame rate and the video signal processed into the corrected frame rate are simultaneously displayed in the first and the second areas of the display unit based on the selected type of the display area from the menu window, when the frame rate demonstration function is not selected by the user, the video signal processed into the corrected frame rate is displayed in an entire area of the display unit.

17. The control method of the display apparatus according to claim 16, wherein if a picture-on-picture type is selected as the type of the area to display the video signal, the displaying comprises displaying the video signal which is processed into the inherent frame rate in a picture-on-picture configuration on the display unit.

18. The control method of the display apparatus according to claim 16, wherein if a picture-in-picture type is selected as the type of the area to display the video signal, the displaying comprises displaying the video signal which is processed into the inherent frame rate in a picture-in-picture configuration on the display unit.

19. The control method of the display apparatus according to claim 16, further comprising receiving a control signal which controls the frame rate demonstration function before the processing.

20. The control method of the display apparatus according to claim 16, wherein the processing comprises performing one of a 3:2 pull down or a 2:2 pull down with respect to the video signal, and then performing a deinterlacing with respect to the video signal which subject to the one of the 3:2 pull down and the 2:2 pull down.

21. The control method of the display apparatus according to claim 16, wherein the displaying further comprises displaying the video signal which is processed into the corrected frame rate in the entire area of the display unit if a demonstration time elapses.

* * * * *